Dec. 9, 1969 R. V. DE LEO ET AL 3,482,445
STRUT MOUNTED DUAL STATIC TUBE
Filed April 25, 1968 2 Sheets-Sheet 2

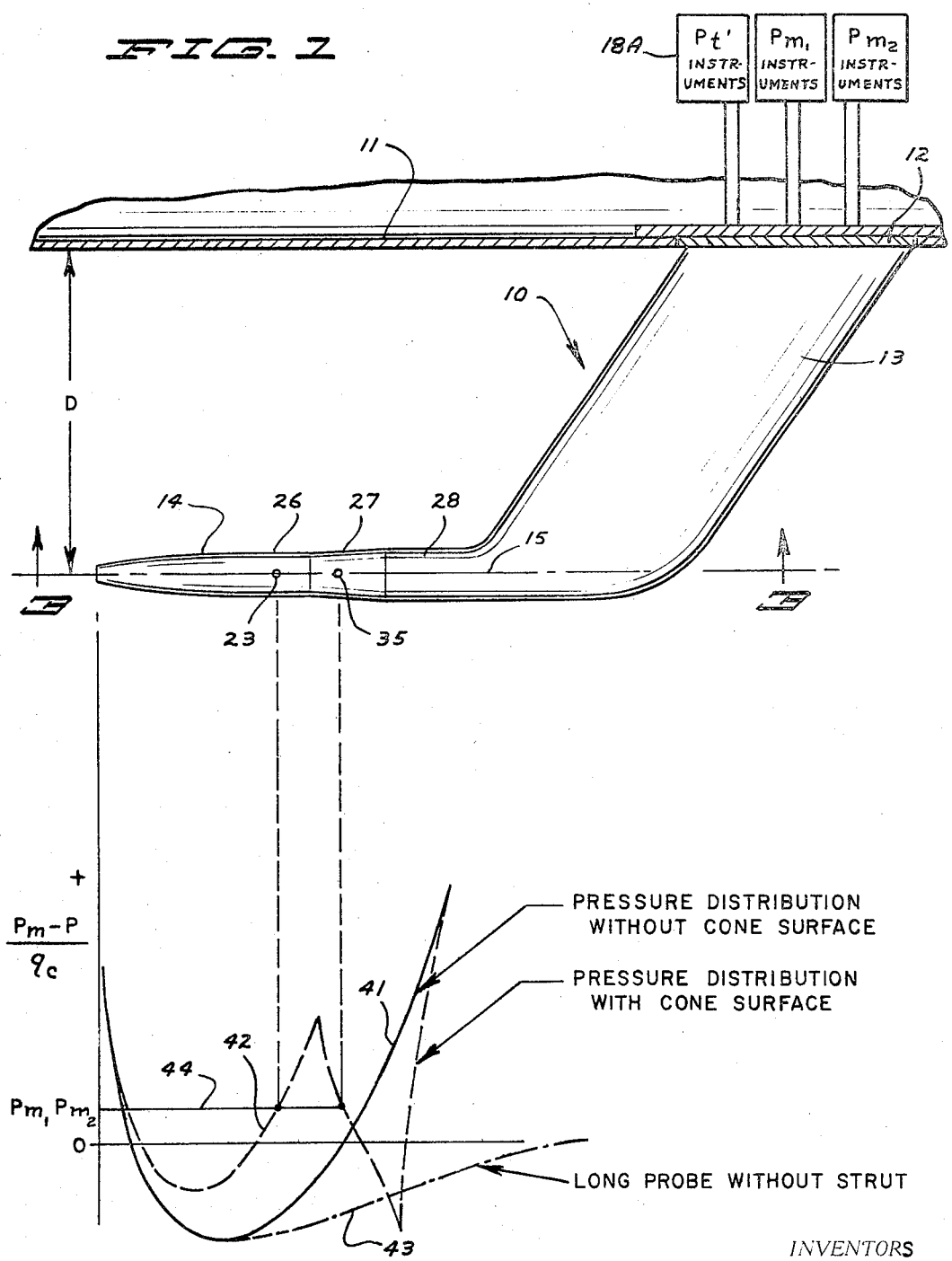

INVENTORS
RICHARD V. DE LEO
FLOYD W. HAGEN
BY
Dugger Peterson Johnson & Westman
ATTORNEYS

United States Patent Office 3,482,445
Patented Dec. 9, 1969

3,482,445
STRUT MOUNTED DUAL STATIC TUBE
Richard V. De Leo, Hopkins, and Floyd W. Hagen, Minneapolis, Minn., assignors to Rosemount Engineering Company, Minneapolis, Minn., a corporation of Minnesota
Filed Apr. 25, 1968, Ser. No. 724,176
Int. Cl. G01c 21/12
U.S. Cl. 73—182                               14 Claims

ABSTRACT OF THE DISCLOSURE

A strut mounted dual static tube providing two separate static pressure measuring systems and using one probe with two separate pressure sensing ports. The probe is designed to have a surface configuration which provides substantially identical static pressure conditions at both of the sensing ports while the axial length of the barrel portion of the sensing instrument is maintained at a minimum and the pressure effects from the strut are compensated for. The structure includes a barrel portion of the probe having sections of different diameters, and a tapered transition surface section between the sections of different diameters, which causes a change in the pressure pattern along the probe to compensate for the pressure disturbance caused by the strut. The positions for the ports for the separate systems are selected from a pressure profile of the probe so the ports are located at equal pressure areas.

BACKGROUND OF THE INVENTION

Field of the invention

The present invention relates to dual static pressure measuring systems using one external strut mounted probe.

Prior art

Various types of compensated dual static tubes have been utilized wherein a single pressure sensing port is used and "fail safe" techniques are provided so that if one of the lines leading to the remote instrument breaks the other line will continue to function. However, many aircraft manufacturers insist upon strict dual systems including separate static sensing ports and sensing chambers. Yet, they do not want to have a complete dual system, including double the number of external probes, so while problems are solved with the prior devices using compensation techniques to two different tubes leading from the same sensing chamber, in certain instances there still is requirement for a dual system using a single probe having two pressure sensing chambers.

Typically, one static line will now be used for operating primary instruments such as airspeed indicators, altimeters, rate of climb indicators and Mach meters. The secondary instruments connected to a second static line may be an air data computer, auto pilot, flight recorder and the like.

In any probe the position of the static pressure port on the probe has a bearing upon the measured pressure relative to actual pressure. Normally any error due to pressure disturbances near the aircraft is compensated for in the instruments or a computer to relate the measured pressure to the true static pressure. The compensation problems are multiplied when a strut is used for mounting the probe because of the air flow and pressure patterns around the strut itself, which disrupt the normal measured static pressure. The pressure pattern around the strut varies greatly with different speeds of the aircraft and different atmospheric conditions.

If the probes could be greatly elongated, the problems would be simplified because the pressure pattern would stabilize. However, the lengths necessary to get a stable pressure pattern so the two spaced apart static pressure ports will sense the same measured static pressure is greater than that permissible for probes which are mounted on the fuselage of aircraft.

The requirement thus is for a short strut-mounted probe which has two separate sets of static pressure sensing ports and wherein the two sets of ports measure the same pressure. An additional requirement is that the ports measure a pressure which has a known and selectable relation to the local static pressure at the probe location.

SUMMARY OF THE PRESENT INVENTION

The present invention relates to a strut mounted probe that is short enough to meet design criteria from a physical standpoint and yet is made to provide two separate static pressure sensing chambers which will give pressure measurements within allowable limits. The probe includes a section having two different cross sectional dimensions and a transition section between the two dimensions which will disrupt the flow along the probe providing a region of decreasing pressure error and in cooperation with the strut providing at least two locations having identical pressures. The pressure pattern is varied so that by positioning the ports in preselected locations the ports with measure identical pressures having a known relation to the local static pressure, and by keeping the transition section at a low angle to flow direction, the effect of changes in speed of an aircraft can also be held to a minimum.

BRIEF DESCRIPTION OF THE DRAWINGS

FIGURE 1 is a top plan view of a probe made according to the present invention installed on a portion of an aircraft;

FIGURE 2 is a graphical representation of a normalized pressure pattern plotted in relation to the length of a probe for three different types of probes, and specifically related in position to FIGURE 1;

DESCRIPTION OF THE PREFERRED EMBODIMENT

Figure 3:
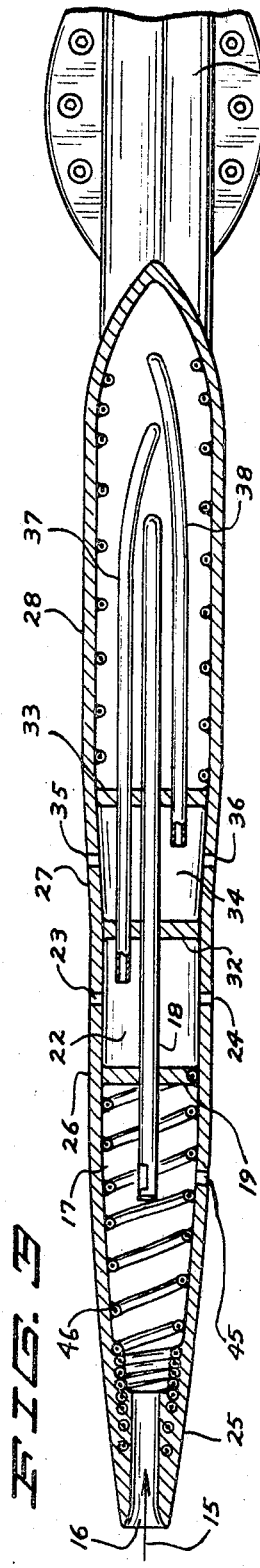
FIGURE 3 is a sectional view taken as on line 3—3 in FIGURE 1.

A pressure sensing probe illustrated generally at 10 is mounted onto portions of a fuselage of an aircraft 11 with suitable mounting means and has a base member 12 that is used to support a laterally outwardly extending strut 13. A tubular probe barrel section 14 is integral with an outer end of the strut 13 and has a longitudinal axis 15 oriented in a predetermined position with respect to the normal axis of flight of the aircraft.

The strut 13 is streamlined, of course, to minimize drag effect, and it is made so that it will space the barrel portion 14 a predetermined distance D from the side of the fuselage 11 so that the barrel is out of the influence of the boundary layer of air on the fuselage.

The probe shown is a combination pitot-static sensing probe, and referring to FIGURE 3, it can be seen that the forward end of the barrel member has a port 16 which faces forwardly and senses the impact pressure on the probe. The port opens into a chamber 17 from which a pitot or impact pressure tube 18 extends. The end of tube 18 in chamber 17 is closed and has an opening near the end to sense pressure. The tube 18 is suitably connected to instruments 18A in the aircraft. A bulkhead 19 on the interior of the barrel portion separates the chamber 17 from a first static pressure sensing chamber 22 which is open to atmosphere through a pair of static sensing ports 23 and 24, as shown diametrically opposed and on the top and bottom of the barrel. The ports 23 and 24 are on the same radial plane. Both ports 23 and 24 open into the chamber 22. An electrical deicing heater 46 is shown on the interior surface of the probe and a drain hole 45 is provided for moisture exhaust.

As shown, the probe barrel has a forward external taper portion 25 which is of conventional design, and which blends into a cylindrical portion 26 in which the ports 23 and 24 are defined.

Usually, the pitot-static probe barrels are of uniform diameter back to the mounting strut. However, in the present invention, a part conical or tapered surface 27 extends rearwardly and outwardly from the cylindrical surface 26 to a second cylindrical surface 28 which is in turn attached to the strut 13. The second cylindrical surface 28 is of larger diameter than the cylindrical surface 26 and the conical surface 27 forms a transition section between these two diameters that is a smooth, streamlined shape. A second bulkhead 32 is positioned in the barrel portion of the probe to seal off chamber 22. A third bulkhead 33 as shown is provided to define a second static pressure chamber 34. The second static chamber 34 is completely isolated from the chamber 22. Third and fourth static pressure sensing ports 35 and 36 are defined through the wall of the barrel and open into the chamber 34. The ports 35 and 36 are also, as shown, diametrically opposed and are in line with the ports 23 and 24 but are spaced axially along the probe therefrom. The axes of ports 35 and 36 are on the same radial plane. A first static pressure sensing tube 37 leads from chamber 22 to suitable primary instruments in the compartment, and a second static pressure line 38 leads from the chamber 34.

While the chamber 34 is shown as defined with a third bulkhead, the chamber 34 could extend all the way to the back end of the probe and actually up into the strut if desired for the positioning of the bulkhead. The chamber 34, however, is sealed from the chamber 22, by the bulkhead 32. In a normal straight cylindrical strut mounted probe, merely positioning two static pressure sensing ports axially along the length thereof to obtain a dual system is not possible because with just a single cylindrical surface, the sensed pressure at the two ports will differ because of the disturbances caused locally by the strut 13 on the ports.

In FIGURE 2, there are three curves presented which show the plotting of a normalized pressure function $$\frac{P_m - P}{q_c}$$

wherein $P_m$ is the measured pressure, P is the local static pressure, and $q_c$ is the impact pressure minus the static pressure. This normalized pressure function is a common factor used as a basis of comparison of pressures. The graph along the A axis is related to the length of the probe in FIGURE 1 as shown. The Y axis shows pressure error, both plus and minus. Note that if $P_m$ equals P, there is no pressure compensation. The first curve 41 shown in solid lines shows pressure error distribution along a probe having a cylindrical barrel portion 14 extending at the same diameter all of the way back to the strut 13. The dashed curve 42 is the pressure distribution along a probe constructed as shown in FIGURE 1 and is related specifically to FIGURE 1 by the dashed lines extending from the static ports 23 and 35. The curve 43 shown as a dot-dash line is for a straight cylindrical probe without any strut 13. It can be seen that if the probe is of substantial length, the pressure distortion will soon disappear and the line will go back to the zero position so that any place along the probe two static ports would measure the same pressure. These curves give the pressure profile of the probe and can be obtained by wind tunnel tests. The influence of the strut can be seen from the departure of curves 41 and 43.

Referring to curve 41 it can be seen that the pressure function, which is dimensionless and normalized, actually becomes a minus quantity along the probe in the tapered forward portion and does not cross the zero line until after it reaches the cylindrical portion. Then, however, the pressure rises substantially in the areas ahead of and adjacent the strut so that it increases rapidly as it approaches the strut.

Any static port has to be located at some distance back from the leading edge of the probe where it is used with a pitot sensing port because of the relative uncertainty and changability of the pressure field adjacent the sharp edge of the port 16 at the nose of the probe, and the adverse effect of the pitot chamber drain hole 45 on the rearwardly sensing ports. Moisture coming from hole 45 can be a problem if adequate space is not left. Further, the flow field around the strut is not as reliable as that obtained midway in the barrel of the probe. Therefore, the static pressure ports should be located remote from the nose or leading edge of a pitot static probe and also remote from the strut as much as possible. If the probe senses only static pressures, the nose or leading edge does not present as much of a problem, but the strut still does. If separately connected static ports were to be located in a normal cylindrical strut mounted probe (curve 41) and measured the same pressures, it can be seen from the pressure profile 41 that one set of ports would have to be very closely adjacent the nose and the other set adjacent the strut. Their performance could not be depended upon because of the variation in the pressure field at the nose, caused by the sharp leading edge, and at the strut. The ports for different chambers must be spaced axially to prevent a reverse flow (out of the probe) from one of the ports caused by failure of a remote line in a pressurized area of the aircraft from affecting the sensed pressure at the second chamber.

The conical surface 27 is introduced to change the pressure distribution or profile on a short probe to give reliable dual sensing. This conical or tapered surface causes a pressure field disturbance ahead of the strut which is predictable and reliable. The pressure pattern or profile is described by the curve 42 and it is shown that ahead of the junction line between the first cylindrical surface 26 and the conical surface 27 the pressure error will come from a negative error to a positive error as shown in FIGURE 2 and this error curve will reverse itself in the region right at the junction line between the two surfaces. The error will then again go toward the negative where the conical surface terminates and the second cylindrical surface 28 begins. This is due to accelerating flow along the tapered surface. The pressure error then goes back toward the positive side and follows the curve 41 in the area closely adjacent the strut 13.

Again, the two ports have to be spaced as much as possible from the nose of the probe and also from the strut for the most reliable pressure profile, and have to be spaced from each other. The minimum axial (probe axis) spacing between the ports for the two chambers is about .375 inch. Preferably the spacing is at least .500 inch to allow for good mechanical design and to minimize disturbance of one port on the other in presence of a leak in one system.

The criteria becomes difficult. Keep the probe short (probably 4 inches minimum to 12 inches maximum), keep the first static ports off the tapered forward portion of the probe end because of unreliability of the pressure field close to the leading end of the probe; keep the second static ports out of the pressure influence immediately adjacent the strut because of the unreliability of the pressure field there; keep the ports for the two systems preferably .500 inch apart in axial direction; and make sure that the two sets of static pressure sensing ports sense the same pressure. Thus, balancing between the positionings of the two separate static ports must be obtained. To select this position a horizontal line 44, which is on the positive compensating side of the graph, is drawn and the location of the static ports is where this horizontal line 44 intersects the curves 42 in two different positions. One of these is on the cylindrical surface 26 and the other is on the conical surface 27. Therefore, it can be seen that the pressure pattern is such that the pressure sensed at the ports along a plane passing through the probe and intersecting the curve 42 and the axis of the ports 23, 24 will be equal to the pressure at the ports 35, 35 on the conical surface 27. Positive compensation is usually preferred as shown to compensate for more general local pressure field disturbances induced by the aircraft structure, but negative error could also be obtained by using a line below zero. The forward port would be on the tapered forward portion of the probe, but still a substantial distance back of port 16. If desired the static ports could be in different, but known, pressure error positions.

There are many axial locations along the axial length of the barrel in which the two sets of ports can be positioned, and this can be indicated merely by changing the position of line 44 with respect to the zero line and using these positions on the probe for location of the axis of the ports leading into the static chambers. By using a pressure profile curve in connection with the probe having a transition section, the selection of the position of the static ports becomes easy.

In order to minimize the Mach number influence on the measurements, two factors are of primary importance. The ports should be kept away from the strut because the pressure changes due to change in Mach adjacent the strut is very marked. The strut is an abrupt change in section of the probe. Next, the included angle of the conical surface with respect to the axis of the probe should be kept to a minimum (2° to 8° maximum). The abruptness of change in section is minimized. The positioning of the ports on the probe itself as far as the radial position is concerned is affected by the influence of angle of attack of the aircraft. The ports can be placed radially around the probe so as to compensate for angle of attack pressure errors associated with the particular aircraft. Multiple ports are generally used to average the pressure measurement and two to four ports are most common. The axis will usually be on a common radial plane, however in some instances the multiple ports may be staggered slightly in the axial direction as well.

Figure 4:
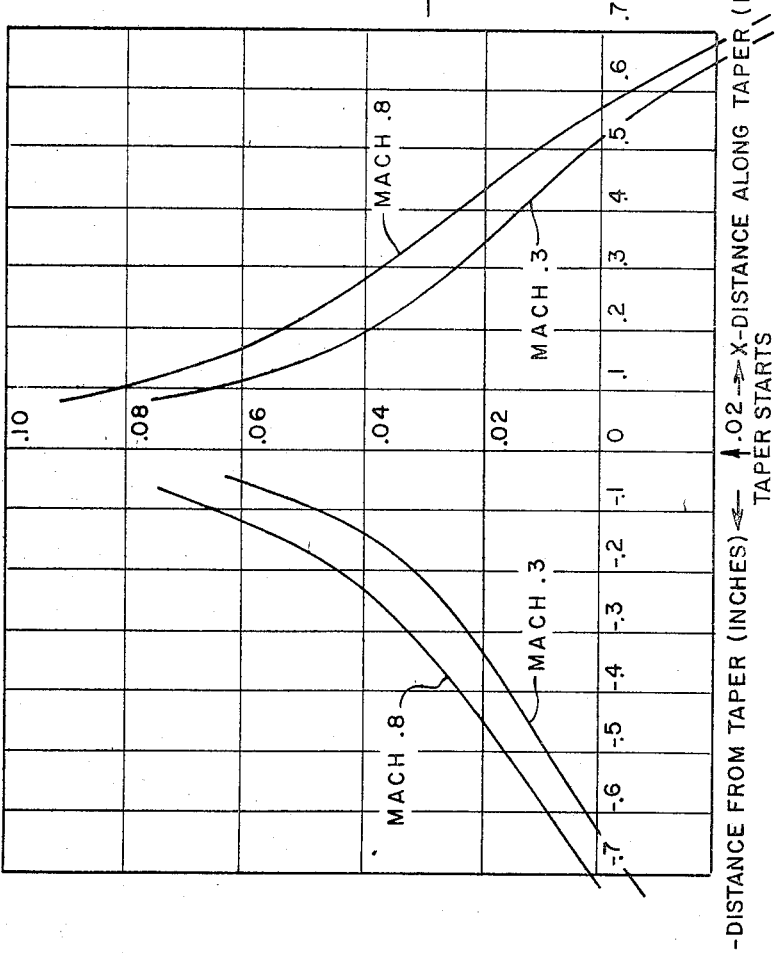
FIGURE 4 is a graphical representation of the center portion of a curve in FIGURE 2 showing the actual normalized pressure curves for a probe made according to the present invention on an enlarged scale.

The graph of FIGURE 4 is actually a representation of the center portion of the graph 42 above the zero line at the X axis. The numerals present the normalized pressure error, as shown in FIGURE 2, and the numbers on the X axis represent the distance along the axis of the probe using the junction between the surfaces 26 and 27 as a zero point. The scale is greatly enlarged, and actual test values shown at Mach .3 and Mach .8. The differential error between Mach .3 and Mach .8 is not great enough so that it causes problems in the measurements. The taper or transition section surface forms a 4° taper with the probe axis in the probe used to obtain the data of FIGURE 4.

The normalized pressure error function $$\frac{P_m - P}{q_c}$$

is a standard term, and it normalizes the difference between the local static pressure and the measured pressure. If there is no difference, this compensation function is zero. However, as shown, the positioning of the ports for chambers 22 and 34 may be such that there is a small known positive pressure compensation which may be a preferred measurement in order to provide a predetermined compensating pressure function right at the source of measurement. This feature is important since it often eliminates the requirement for additional compensating devices at the pressure indicating instruments for example.

What we claim is:

1. A dual static pressure measuring system for use with an external probe having a mounting strut for mounting said probe in spaced relationship to an external surface of an aircraft, comprising a probe barrel, said barrel having first and second barrel sections of substantially identical cross sectional shape, and of different cross sectional dimensions, and a barrel transition section defining an exterior surface joining said first and second barrel sections, said exterior surface forming an angle with respect to the axis of said probe, a first static pressure chamber and a second static pressure chamber defined inside said probe barrel, first port means opening through said barrel to said first static pressure chamber, and second port means opening through said barrel to said second static pressure chamber, said second port means being spaced from the first port means in direction of the probe axis, said probe having a determinable measured pressure profile for axial flow along its length, said first and second ports being located in position wherein said measured pressures at the ports are substantially equal.

2. The combination as specified in claim 1 wherein said first and second ports are spaced apart in axial direction of said probe a minimum of ⅜ inch.

3. The combination as specified in claim 1 wherein said second barrel section is of larger cross section dimension than said first barrel section and trails said first barrel section, said strut means being fastened to said second barrel section.

4. The combination as specified in claim 3 wherein said first and second barrel sections are cylindrical.

5. The combination as specified in claim 4 wherein said transition section forms a substantially conical outer surface joining said first and second cylindrical barrel sections.

6. The combination as specified in claim 1 wherein fluid flow past said probe causes a normal pressure field disturbance area ahead of said strut, said normal disturbance having a rearwardly increasing pressure, and wherein said transition section is of size to create a localized pressure field disturbance in position to counteract a portion of the pressure field disturbance ahead of said strut and to provide a zone of rearwardly decreasing pressure in the disturbance area when fluid flows past said probe, at least one of said port means being located to sense pressure in the zone of pressure field disturbance created by said transition section.

7. The method of locating static pressure ports for two separate static pressure systems on a single strut mounted pressure sensing probe having a barrel, and a strut for positioning said barrel in a predetermined orientation to airflow and spaced from a mounting surface of an aircraft, comprising the steps of:
    providing a barrel having two different diameters and a smooth transition section between said diameters, said transition section being spaced from said strut and from the outer end of said barrel;
    establishing a pressure profile along the length of said barrel and including said transition section;
    selecting substantially equal pressure points from said pressure profile which are spaced apart a predetermined minimum distance;
    projecting radial planes from said points on said profile through said barrel; and
    positioning separately connected pressure ports having their respective axes in said radial planes in said barrel.

8. In a short air data sensing probe having a strut extending from said probe adjacent one end thereof for mounting said probe in spaced relation to a surface and comprising a barrel member having an axis extending in a predetermined relationship to fluid flow past the probe, the improvement comprising two independent, separate static pressure sensing systems on said probe and including first means defining a low angle surface section size change on the probe spaced forwardly from the strut and rearwardly from a leading end of the probe and creating a pressure field disturbance along said probe, a first static pressure sensing port opening through a wall of said probe forwardly from the first means, and a second static pressure sensing port opening through a wall of said probe and axially spaced from said first port, said second port being positioned with respect to the first means so that the measured pressures at said first and second ports are substantially equal.

9. The air data sensing probe of claim 8 further characterized in that the first means comprises a conical exterior surface having a rearwardly increasing diameter and forms an included angle between 2° and 8° with respect to the probe axis.

10. The air data sensor of claim 8 further characterized in that the probe has first and second substantially cylindrical sections, said first section leading said second section and having a smaller diameter than said second section, said first means defining a tapering surface joining said first and second sections.

11. The air data sensor of claim 10 wherein the strut is attached to the second barrel section.

12. The air data sensor of claim 8 wherein the barrel comprises first and second barrel sections of substantially identical cross sectional shape and of different cross sectional dimensions, said first section leading the second section and being of smaller dimension that said second section, said first means comprising a tapering surface joining said first and second barrel sections, said tapering surface being shaped so that the normalized pressure error $$\frac{(P_m - P)}{q_0}$$

of said probe is negative along portions of said first barrel section and becomes positive adjacent the start of said tapering surface and then becomes negative rearwardly from the start of said tapering surface, and wherein $P_m$ is the measured static pressure, $P$ is the local static pressure and $q_c$ is the impact pressure minus the static pressure.

13. In a short probe for sensing static fluid pressures having a laterally extending mounting strut at a rear portion of the probe for mounting said probe in spaced relationship to an external surface in a fluid flow stream and having a short probe barrel, the improvement comprising a first probe barrel section having a longitudinal axis and being positioned at a leading portion of the probe with respect to the fluid flow stream, a substantially cone shaped compensation surface on the probe barrel positioned rearwardly of said first barrel section and forwardly of said mounting strut, said cone shaped surface increasing in cross sectional size in rearwardly direction at an angle between substantially 2° to 8° with respect to said longitudinal axis, at least one static pressure sensing means, port means opening through said probe barrel to said static pressure sensing means, said probe barrel having a determinable measured static pressure profile along an outer surface of the probe during fluid flow along the probe, said cone shaped surface causing a region of positive static pressure disturbance upstream from the strut whereby the measured static pressure in said region has a known relation to the local static pressure, said port means being spaced upstream from the strut and located to sense pressure in said region of positive static pressure disturbance.

14. The probe of claim 13 further characterized in that said port means is positioned on said first barrel section.

References Cited

UNITED STATES PATENTS 3,400,583    9/1968    Newport et al. ____ 73—212 XR

DONALD O. WOODIEL, Primary Examiner

U.S. Cl. X.R.

73—212